Oct. 9, 1928.

L. W. MELCHER

CAR AXLE BEARING

Filed Dec. 4, 1926

1,687,221

Inventor:
Lee W. Melcher
By Fred Gerlach
his Atty.

Patented Oct. 9, 1928.

1,687,221

UNITED STATES PATENT OFFICE.

LEE W. MELCHER, OF WEST DE PERE, WISCONSIN.

CAR-AXLE BEARING.

Application filed December 4, 1926. Serial No. 152,547.

The invention relates to car axle bearings.

One object of the invention is to provide improved lubricating means for car axle bearings.

Another object of the invention is to provide improved means for lubricating roller bearings for car axles.

Heretofore in roller bearings for car axles, it has been the practice to permit the portions of the lowermost rollers to run in oil. An objection to this was that the impurities accumulating in the oil were circulated around the bearing surfaces. Another object of the invention is to overcome this objection by providing a roller bearing with means by which the oil is fed in regulated quantity to the bearing and filtered or purified before it is again fed to the bearing.

Other objects of the invention will appear from the description.

The invention consists in the several novel features hereinafter set forth and more particularly defined by the claims at the conclusion hereof.

Figure 1:
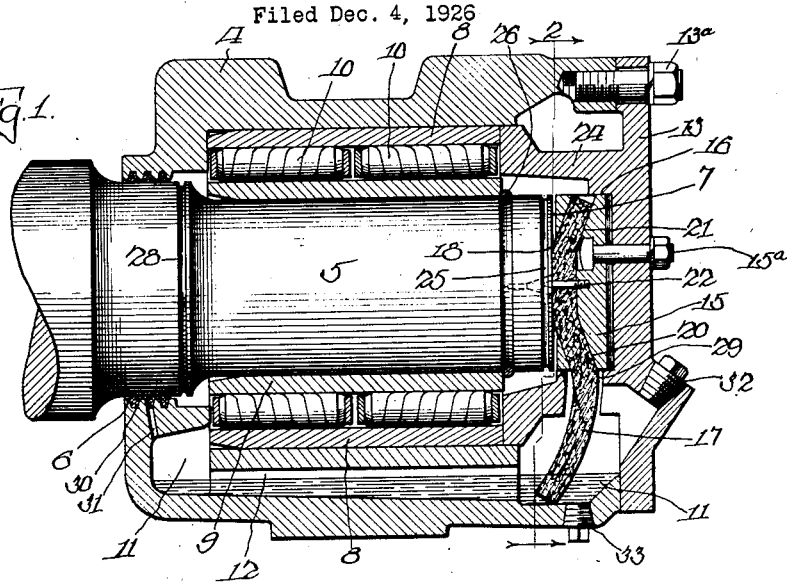
Figure 2:
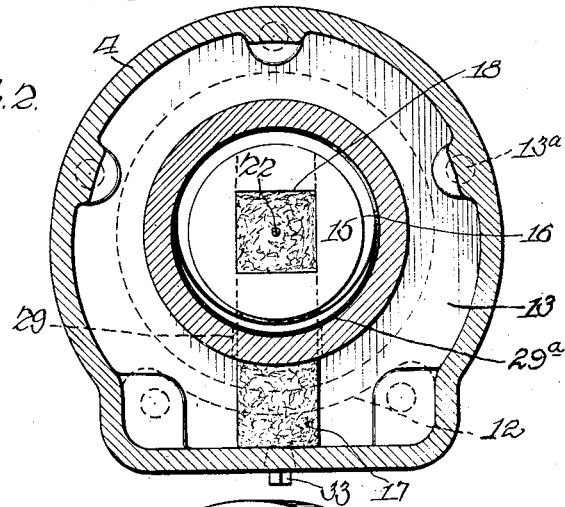
Figure 3:
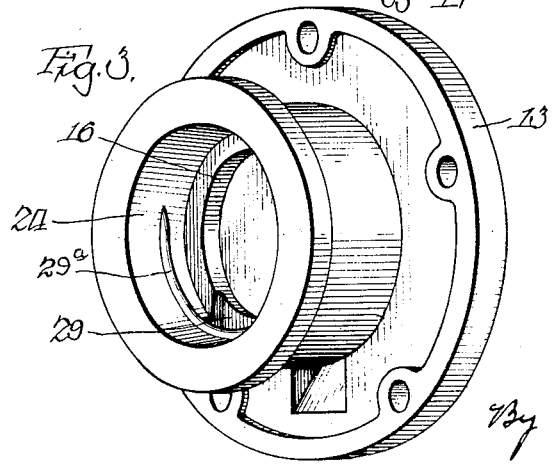

In the drawings: Fig. 1 is a longitudinal section of a device embodying the invention, the axle being shown in elevation. Fig. 2 is a section taken on line 2—2 of Fig. 1. Fig. 3 is a perspective of the cap at the outer end of the box, viewed from the inner side thereof.

The invention is exemplified in a device comprising a box or casing 4 which is guided in the truck in the usual and suitable manner, and an axle 5 which extends through an opening 6 in one end of the box and terminates in a transverse face 7 within and near the other end of the box. An outer race or bushing 8 is pressed and fixedly held in the box, and an inner race or bushing 9 is shrunk and fixedly held on the axle 5. A locking ring 26 for the bushing 9 is secured in a peripheral groove in the axle. Two annular series of caged bearing rollers 10 are confined between said races and constitute a roller bearing for supporting the box from the axle. An oil well 11 is formed in the lower portion of, and extends from, end to end of the box. This well includes a longitudinal duct 12 which extends through the box wall which carries the race 8, so that oil will return from the inner end of the box to the outer end. The outer end of the box 4 is provided with an end cap or cover 13 which is removably secured by bolts 13ª to the box, to permit access to the roller bearings and the insertion of the elements thereon into the box.

A circular thrust block 15, usually of brass, is secured by a bolt 15ª in a recess 16 formed in the inner face of the cap 13, and is normally spaced away from the end face 7 of the axle. This block carries a vertically extending wick 17 and has its inner face formed with an opening 18 to expose a portion of the wick. This opening 18 is formed in the central portion of the thrust block 15 so the wick will contact only with the central portion of the end face 7 of the axle and correspondingly apply lubricant to the axle, and leaving the outer portion of said end face free so that oil may travel outwardly under the influence of centrifugal force, away from the wick. The lower end of the wick extends into the well 11 to continuously feed oil by capillary attraction to the central portion of the end face 7 of the axle. The wick, above and below its exposed portion in the opening 18, is contained in outwardly inclined upper and lower openings 20 and 21 in the block 15. A pin 22, carried by said block, extends into the wick to hold the central portion of the wick against displacement by the rotating axle, the end of which is recessed to avoid contact with the inner end of the pin. An annular wall 24, integrally formed with the cap 13, extends inwardly therefrom to meet the outer end of the race 8 and adjacent the outer ends of the rollers, to catch oil thrown outwardly from the axle by centrifugal force, and to conduct it to the space in which the rollers work. This wall 24 is sloped downwardly and inwardly to direct the oil to said space, and has a rib 29ª to confine the oil against outward travel. An annular groove 25 is formed in the axle adjacent the end face 7 to arrest the oil against inward movement along the axle, so that it will cause it to be projected by centrifugal force to the wall 24. The wick 17 extends through an opening 29 in the lower portion of wall 24 into the outer end of the oil well 11. The outer periphery of the wall 24, at its inner end, is formed to fit in the wall of the box 4 in which the race 8 is secured to confine the oil to the bearing surface in the sleeve 8. The axle adjacent the inner end of the box is provided with an annular groove 28 to arrest the oil against inward longitudinal movement along the axle and to cause it to be projected outwardly by centrifugal force into the outer end of the box, from which it will flow back into the oil well 11. The usual oil and dust seal 30 is provided at the inner end of the box and a duct 31 carries any oil accumulating there back into the oil well. The cap 13 is provided with a filler plug 32 and the bottom wall of the box with a drain plug 33.

The operation will be as follows: The wick 17 will supply oil from well 11 by capillary attraction to the portion in the opening 18 in the thrust bock 15, so that oil will be applied to the central portion of the rotating axle. From the central portion, centrifugal force will cause the oil to flow or be thrown outwardly between the inner face of the thrust block and the end face 7 of the axle. The centrifugal force will also throw the oil to the annular wall 24 which will direct it to the outer end of the space in which the bearing rollers 10 operate, the grooves 25 and 26 serving to prevent the flow of oil inwardly along the periphery of the axle. The rollers will work the oil longitudinally to the inner end of the box, where it will flow back into the oil well for re-circulation. Should any oil remain on the inner end of the axle, groove 28 will arrest it against inward movement and cause it to be thrown outwardly by centrifugal force so it will flow back into the oil well. As the oil circulates in this manner, it is cleansed in passing through the wick which retards any particles of metal or foreign matter which may reach the oil well. A characteristic of the construction is that the volume of the oil delivered to the bearing is controlled by the capacity of the wick independently of the speed of the axle, the portions of the wick held in the inclined openings 20 and 21 in the block 15 serve to maintain a supply of oil in the wick in event the axle moves outwardly against the thrust block 15 and compresses the exposed portion of the wick in engagement therewith.

The invention exemplifies a car axle bearing of the roller type in which the oil is circulated longitudinally of the bearing surfaces and fed in regulated quantity to one end thereof by means of a wick which filters the oil, so that the impurities circulating in the oil will not be fed to the roller bearing. The invention also exemplifies a bearing in which the wick carried by the box cap is used to feed oil to the end of the axle with means for directing the oil thrown outwardly by centrifugal force, to one end of the bearing. The invention also exemplifies a bearing of the roller type in which the cap carries the means for feeding the oil to the axle and for confining the oil against outward movement, so that it must pass inwardly to the inner end of the bearing before it flows back to the latter.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a box having an oil-well in its lower portion, an axle extending into the box, and a series of rollers between the axle and said box, of means to deliver oil from the well to the outer end of the axle, so the oil will be thrown outwardly by centrifugal force, means on the axle to arrest the longitudinal travel of the oil away from said end, and means to direct the oil so thrown to the rollers.

2. The combination with a box having an oil-well in its lower portion, an axle extending into the box, and a series of rollers between the axle and said box, of means to deliver oil from the well to the outer end of the axle, so the oil will be thrown outwardly by centrifugal force, means to direct the oil so thrown to the rollers, and means to return the oil from the rollers to the well.

3. The combination with a box having an oil-well in its lower portion, an axle extending into the box, and a bearing between the axle and said box, of a thrust-block adjacent one end of the axle, means in the central portion of the block to deliver oil from the well to the central portion of said end of the axle, so the oil will be thrown outwardly by centrifugal force, and means to direct the oil so thrown to the bearing.

4. The combination with a box having an oil-well in its lower portion, an axle extending into the box, and a series of rollers between the axle and said box, of a thrust-block adjacent one end of the axle, a wick to deliver oil from the well and contacting with the said end of the axle, so the oil will be thrown outwardly by centrifugal force, and means to direct the oil so thrown to the bearing.

5. The combination with a box having an oil-well in its lower portion, an axle extending into the box, and a bearing between the axle and said box, of a thrust-block adjacent one end of the axle having a central opening in its face which is contiguous to said end of the axle, a wick in said opening of the block to deliver oil from the well to said end of the axle, so the oil will be thrown outwardly, and means to direct the oil so thrown to the bearing.

6. The combination with a box having an oil-well in its lower portion, and provided at one end with a removable cap, an axle extending into the box, and a bearing between the axle and the box, of a wick to deliver oil from the well to one end of the axle, so the oil will be thrown by centrifugal force, a thrust-block carried by the cap and in which the wick is carried, and means to direct the oil thrown by the axle, to the bearing.

7. The combination with a box having an oil-well in its lower portion, and provided at one end with a removable cap, an axle extending into the box, and a series of rollers between the axle and the box, a wick to deliver oil from the well to one end of the axle, so the oil will be thrown outwardly by centrifugal force, a thrust-block carried by the cap, and in which the wick is carried, means to direct the oil thrown by the axle, to the rollers, and means to deliver oil from the rollers to the well.

8. The combination with a box having an oil-well in its lower portion, a removable cap for closing one end thereof, an axle extending into the box, and a bearing between the axle and said box, of means to deliver oil from the well to the central portion of the end of the axle which extends into the box, so the oil will be thrown outwardly by the centrifugal force, and means carried by the cap to direct the oil thrown by the axle to the bearing.

9. The combination with a box having an oil-well in its lower end, an axle extending into the box and a bearing comprising a series of rollers between the axle and said box, of means to deliver oil from the well to one end of the axle, so it will be thrown outwardly by centrifugal force, and means to receive the oil thrown by the axle and direct it to the rollers at the lower portion of the bearing.

10. The combination with a box, having an oil-well in its lower portion, a removable cap for one end of the box, an axle extending into the box, and a bearing comprising a series of rollers between the axle and said box, of means to feed oil from the well and throw it outwardly by centrifugal force, and a substantially annular wall disposed in the box and having a surface to receive and direct the oil thrown by said means to the rollers.

11. In a car axle bearing, the combination of a box having an oil well in its lower portion, an axle extending into the box, rollers around the axle and above the well, a wall in the box forming a completely cylindrical outer bearing for the rollers, means for feeding oil from the well to the outer end of the bearing so it will be applied to the rollers and confine the oil so it will pass to the inner end of the bearing, and means at the inner end of the bearing for returning the oil to the well.

12. In a car axle bearing, the combination of a box having an oil well in its lower portion, an axle extending into the box, rollers around the axle and above the well, a wall in the box forming a completely cylindrical outer bearing for the rollers, means for feeding oil from the well to the outer end of the bearing so it will be applied to the rollers, means to confine the oil so it will pass to the inner end of the bearing, and a duct at the inner end of the bearing for returning the oil from the bearing to the well.

13. In a car axle bearing, the combination of a box having an oil well in its lower portion, an axle extending into the box, rollers around the axle and above the well, a wall in the box forming a completely cylindrical outer bearing for the rollers, a wick, means for feeding oil from the wick to the outer end of the bearing so it will be applied to the rollers, and for confining the oil so it will pass to the inner end of the bearing, and means at the inner end of the bearing for returning the oil to the well.

14. In a car axle bearing, the combination of a box having an oil well in its lower portion, a cap for closing the outer end of the box, an axle extending into the box, rollers around the axle and above the well, a wall in the box forming a completely cylindrical outer bearing surface for the rollers, means carried by the cap for feeding oil from the well to the outer end of the axle, means on the cap to direct oil thrown by the axle to the outer end of the bearing to be applied to the rollers, and means at the inner end of the bearing for returning the oil to the well.

15. In a car axle bearing, the combination with a box having an oil well in its lower portion, an axle extending into the box, a wall in the box forming a completely cylindrical bearing, rollers around the axle and engaging said cylindrical bearing, a wick for conducting oil from the well to the outer end of the axle so it will be thrown outwardly by centrifugal force, and means to direct the oil so thrown to the outer end of said bearing surface.

16. In a car axle bearing, the combination with a box having an oil well in its lower portion, an axle extending into the box, a wall in the box forming a completely cylindrical bearing, rollers around the axle and engaging said cylindrical bearing, a wick for conducting oil from the well to the outer end of the axle so it will be thrown outwardly by centrifugal force, means to direct the oil so thrown to the outer end of said bearing surface, and means for conducting the oil from the inner end of the bearing to the well.

Signed at Chicago, Illinois, this 12th day of November, 1926.

LEE W. MELCHER.